(12) United States Patent
Leskiw

(10) Patent No.: US 9,668,396 B2
(45) Date of Patent: *Jun. 6, 2017

(54) METHOD AND APPARATUS FOR ENHANCING THE SOIL STRUCTURE OF LAND

(71) Applicant: Leonard Leskiw, Edmonton (CA)

(72) Inventor: Leonard Leskiw, Edmonton (CA)

( * ) Notice: Subject to any disclaimer, the term of this patent is extended or adjusted under 35 U.S.C. 154(b) by 617 days.

This patent is subject to a terminal disclaimer.

(21) Appl. No.: 13/625,370

(22) Filed: Sep. 24, 2012

(65) Prior Publication Data

US 2013/0019786 A1 Jan. 24, 2013

Related U.S. Application Data

(62) Division of application No. 12/628,330, filed on Dec. 1, 2009, now Pat. No. 8,272,340.

(30) Foreign Application Priority Data

Sep. 1, 2009 (CA) ..................................... 2676771

(51) Int. Cl.
*A01C 15/00* (2006.01)
*A01B 15/08* (2006.01)

(52) U.S. Cl.
CPC .............. *A01B 15/08* (2013.01); *A01C 15/00* (2013.01)

(58) Field of Classification Search
CPC ......... A01C 15/00; A01B 15/08; A01B 15/02; A01B 15/00
USPC ............. 172/1, 699; 111/900, 200, 149, 156
See application file for complete search history.

(56) References Cited

U.S. PATENT DOCUMENTS

| | | | |
|---|---|---|---|
| 3,563,045 A | 2/1971 | Hansen | |
| 3,618,538 A | 11/1971 | Brannan | |
| 3,699,693 A | 10/1972 | Nelkin et al. | |
| 3,854,429 A | 12/1974 | Blair | |
| 3,908,567 A * | 9/1975 | Brannan | 111/119 |
| 4,033,271 A | 7/1977 | Williams et al. | |
| 4,119,223 A | 10/1978 | Fiechter | |
| 4,337,712 A | 7/1982 | Michalko | |
| 4,592,294 A | 6/1986 | Dietrich, Sr. et al. | |
| 5,136,954 A * | 8/1992 | Fetaz et al. | 111/123 |

(Continued)

FOREIGN PATENT DOCUMENTS

CA 2 485 632 A1 10/2005

OTHER PUBLICATIONS

Canadian Office Action, mailed Jul. 9, 2012. 3 pages.

(Continued)

*Primary Examiner* — Christopher J Novosad
(74) *Attorney, Agent, or Firm* — Davis & Bujold PLLC; Michael J. Bujold

(57) ABSTRACT

A method of enhancing the soil structure of land having a topsoil layer and a subsoil layer beneath the topsoil layer includes providing at least one subsoil tiller blade having a tilling surface and a bottom end, and a channel positioned behind the tilling surface of the subsoil tiller blade for injecting nutrients toward the bottom end of the subsoil tiller blade. The subsoil tiller blade is inserted into the land such that the bottom end extends into the subsoil layer. The subsoil tiller blade is driven through the land such that the tilling surface loosens the subsoil layer while the channel deposits nutrients into the subsoil layer.

5 Claims, 3 Drawing Sheets

(56) References Cited

U.S. PATENT DOCUMENTS

| | | | |
|---|---|---|---|
| 5,433,277 A | 7/1995 | Davison | |
| 5,558,471 A | 9/1996 | Payne | |
| 6,860,336 B2* | 3/2005 | Robillard | 172/724 |
| 7,004,090 B2 | 2/2006 | Swanson | |
| 8,272,340 B2* | 9/2012 | Leskiw | 111/156 |
| 2003/0113903 A1 | 6/2003 | Miyazaki | |
| 2006/0254331 A1 | 11/2006 | Burnham | |
| 2009/0078178 A1 | 3/2009 | Beaujot | |

OTHER PUBLICATIONS www.agrowplow.com/content/blogcategory/15/64/ (AgrowPlow)—Website owner: Soil Care Systems International Pty Ltd., 1 pg.—Available online at least as early as Jun. 2008.
www.agrowplow.com/content/view/17158/ (BioPlow)—Website owner: Soil Care Systems International Pty Ltd., 1 pg.—Available online at least as early as Jun. 2008.
Bigham Brothers Paratill Subsoiler. Available as early as Dec. 1998 at http://www.bighambrothers.com/ptillshr.htm.

\* cited by examiner

METHOD AND APPARATUS FOR ENHANCING THE SOIL STRUCTURE OF LAND

FIELD

A method and apparatus for enhancing the soil structure of land.

BACKGROUND

Subsoil tillers are used to till the subsoil of land, which loosens the soil to a deeper depth, while also reducing the amount of soil erosion. An example of a subsoil tiller is the Paratill™ produced by Bigham Brothers Inc.

SUMMARY

There is provided a method of enhancing the soil structure of land having a topsoil layer and a subsoil layer beneath the topsoil layer. The method comprises the steps of providing at least one subsoil tiller blade having a tilling surface and a bottom end, and a channel positioned behind the tilling surface of the subsoil tiller blade for injecting nutrients toward the bottom end of the subsoil tiller blade. The subsoil tiller blade is inserted into the land such that the bottom end extends into the subsoil layer. The subsoil tiller blade is driven through the land such that the tilling surface loosens the subsoil layer while the channel deposits nutrients into the subsoil layer.

According to another aspect, there is provided an apparatus for use in enhancing the soil structure of land having a topsoil layer and a subsoil layer. The apparatus comprises a support frame, and at least one subsoil tiller blade mounted below the support frame. The subsoil tiller blade has a tilling surface that loosens the subsoil when driven through the land, and a bottom end. A storage tank has a conveyor for conveying nutrients into an outlet of the storage tank. At least one channel has an inlet connected to the outlet of the storage tank and an outlet toward the bottom end of the at least one subsoil tiller for depositing the pellets into the subsoil layer.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method and apparatus for reclaiming land will now be described with reference to FIG. 1 through 3.

In order to enhance the soil structure the land, tilling is used to loosen the soil and relieve the compaction. In reclamation projects, the area will be replanted in order to allow nature to relaim the land. However, it is difficult for roots to grow through compacted land, and the roots have a tendency to remain close to the top where the soil is looser, which slows the recovery of the subsoil.

It may be desireable to enhance the soil structure of various types of soil for different reasons, such as to reclaim the land after working, improve the soil structure in farmland, or enhance the structure in naturally occurring soils. For example, the soil structure of land at worksites is often damaged by heavy equipment. Sites typically damages may include along power lines, along oil and gas pipelines, and well site pads. This makes it difficult for plants to establish roots in the ground. Left to nature alone, recovery can take from 30 to 50 years. Other examples includes farm land, where repeatedly driving over land creates a hard "shell" under the topsoil that is tilled regularly, or soils that are naturally compacted, for a variety of reasons.

The present method encourages the growth of root systems by loosening the compacted land, and injecting nutrients at an appropriate depth in the subsoil. The nutrients encourage the roots to grow downward to reach them, and the loosened soil makes it easier for the roots to reach them. The depth of injection will vary depending on soil conditions, however it is anticipated that a depth of between 20 cm and 50 cm is sufficient for most situations. As the roots grow deeper, more moisture and nutrients are available to them, and the plants become stronger and more productive. The land is reclaimed or enhanced as root systems are established. As the roots from previous years plant growth decays, the repair of soil structure is perpetuated. Some results have suggested that recovery of the land occurs using the method described herein within five years instead of 30 to 50 years.

Figure 2:
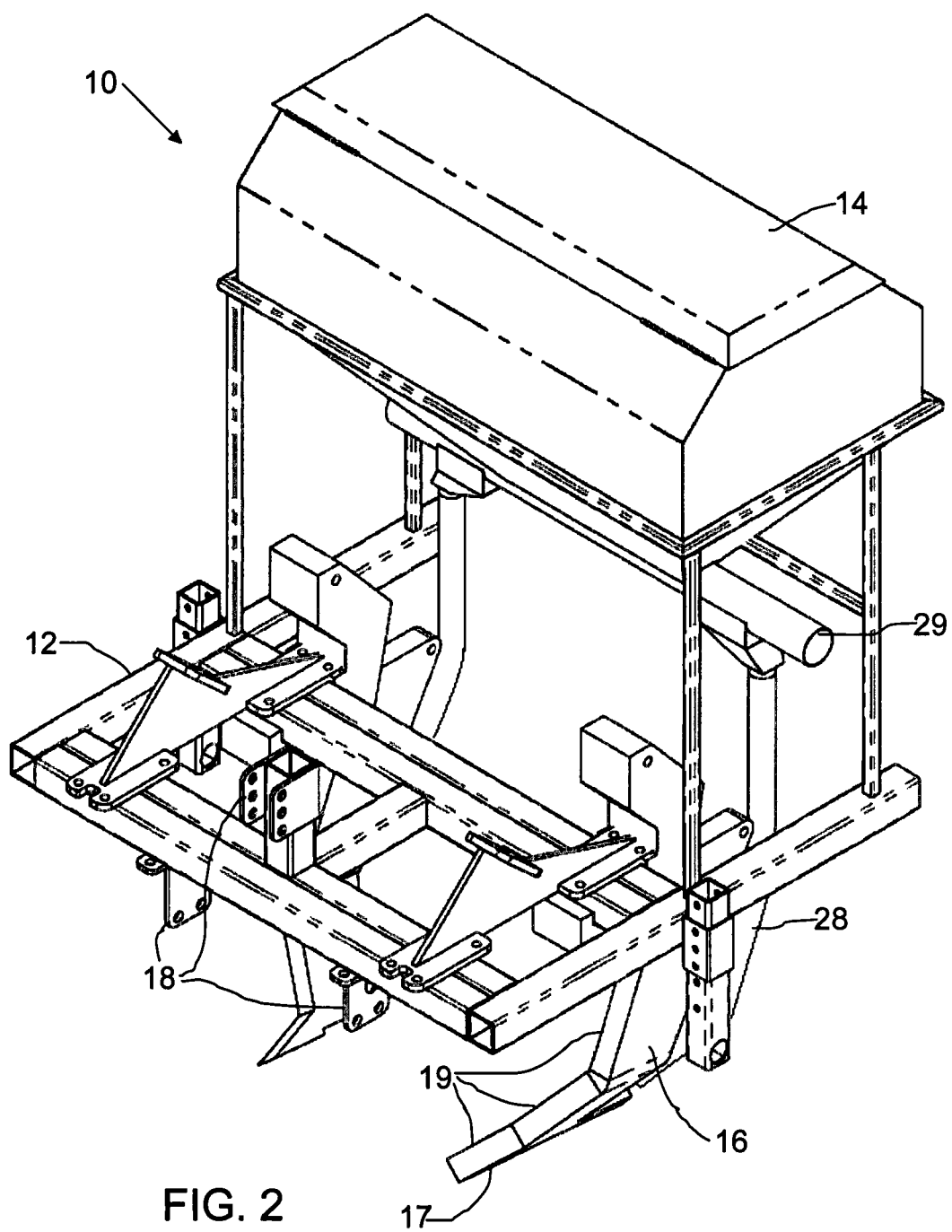
FIG. 2 is a perspective view of a subsoil tiller.
Figure 3:
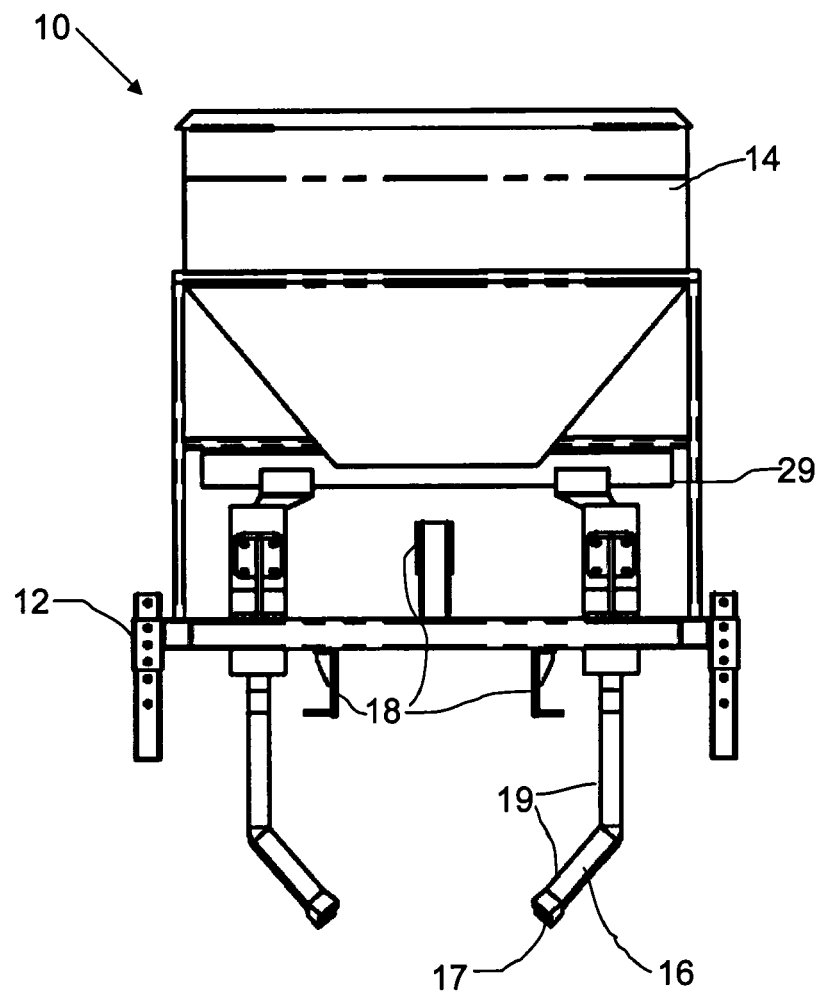
FIG. 3 is a front elevation view of the subsoil tiller.

Referring to FIGS. 2 and 3, a subsoil injector 10 has a support frame 12 with a storage tank 14, such as a hopper as depicted, mounted above support frame 12 for holding the nutrients to be injected, and a subsoil tiller 16 attached below support frame 12 with a bottom end 17. Instead of being mounted above support frame 12, storage tank 14 may be on a trailer that is pulled behind support frame 12, or mounted on or pulled by a separate vehicle altogether. The actual design of storage tank 14 relative to support fram 12 will at least partly depend on the form of nutrients and type of conveyor described below. As show, there are two subsoil tillers 16 that curve toward each other with bottom ends 17 about two feet apart. The subsoil tillers 16 depicted are similar to the Paratill™ produced by Bigham Brothers Inc. Two subsoil tillers 16 are shown with tilling ends 17 about two feet apart. The number and type of subsoil tillers 16 including their spacing will depend on the preferences of the user, however two is a convenient number as two injection channels 28 (described below) can be easily fed by the same auger 29. Subsoil tillers 16 have tilling surfaces 19 that fracture the subsoil layer 26 with minimal disturbance to the topsoil layer 24, which reduces erosion and mixing of topsoil and subsoil. As shown, tilling surfaces 19 curve along with subsoil tillers 16 to fracture the subsoil layer 26 at an almost horizontal angle toward bottom ends 17.

Subsoil injector 10 has a three-point hitch 18 to be attached to a prime mover, such as a tractor (not shown). The depth of subsoil injector 10 can then be controlled by the prime mover via the three point hitch. The prime mover pulls subsoil injector 10 through the land to be enhanced. While this is a common approach for operating tilling implements, it will be understood that depth control and motive forces may also be applied using other strategies.

Figure 1:
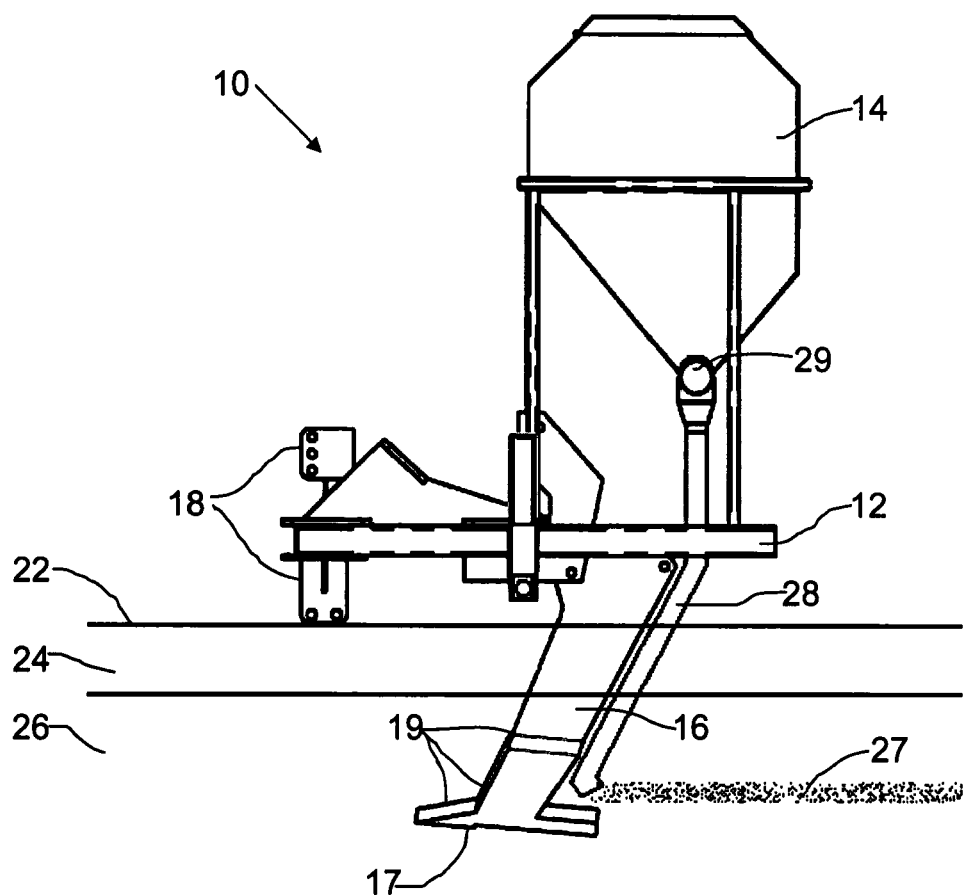
FIG. 1 is a side elevation view of the subsoil tiller pulled through land to be reclaimed.

Referring to FIG. 1, subsoil injector 10 is used to enhance the soil structure of land 22 that has a topsoil layer 24 and a subsoil layer 26. Nutrients 27 are injected into subsoil layer 26 via a channel 28. Nutrients 27 are preferably in the form of pellets for ease of handling and depositing, but may also be in other forms, such as powder, liquid, etc. Channel 28 guides nutrients as they pass from hopper 14 into subsoil layer 26 toward tilling end 17 of subsoil tiller 16. Channel 28 is preferably supported by subsoil tiller 16, and may be connected to its trailing edge. Alternatively, channel 28 may be integrally formed in subsoil tiller 16. Preferably, channel 28 is positioned relative to subsoil tiller 16 so that it does not unnecessarily impede its operation. There is preferably one channel 28 for each subsoil tiller 16 to obtain a better distribution of nutrients, but subsoil tillers 16 may be included that do not have channels 28, or that have more than one channel 28, such as channels that deposit nutrients at different depths. Hopper 14 feeds pellets 27 into channel 28 via a conveyor, such as an auger 29 as shown. Other conveyors may also be used, such as a driven belt, a pneumatic system, a pump, or a dispenser, such as a dispensing valve. The conveyors will depend on the form of nutrients. These conveyors preferably are controllable that allows the amount of nutrients 27 being deposited in subsoil layer 26 to be controlled. In one example, twenty tonnes per hectare of nutrients 27 were deposited, with the nutrients expected to provide sufficient nutrients to last approximately three years. Preferably, the tilling and injection will occur either in early spring or late fall, however the fall may be preferred as the land may be more vulnerable to compaction during spring.

Preferably, nutrients 27 are in pellet form to make them easier to handle and inject. Nutrients 27 may be pellets of organic matter that has been dehydrated, sterilized and compacted, such as a pelletized version of the organic matter that is available from EarthRenew Organics Ltd. of Calgary, AB. Pellets may also be fertilizers, material containing carbon, or combinations. Pellets may be in granular form similar to traditional fertilizer, or have a larger diameter, and will depend on the final design of hopper 14, channel 28 and conveyor 29.

As subsoil tillers 16 break up the compacted ground, this opens the ground for roots to establish themselves. Deep root action is encouraged as nutrients are injected in subsoil layer 26, and facilitated by subsoil tiller 16 breaking up soil layers 24 and 26.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An apparatus for use in enhancing the soil structure of land having a topsoil layer and a subsoil layer, the apparatus comprising:
   a support frame;
   at least one subsoil tiller blade mounted below the support frame, the at least one subsoil tiller blade having a tilling surface that loosens the subsoil when driven through the land, and a bottom end, the at least one tilling surface being spaced from the support frame a distance that causes the tilling surface to extend to a depth of between 20 cm and 50 cm below a top surface of the topsoil layer and into the subsoil layer;
   a storage tank having a conveyor for conveying nutrients into an outlet of the storage tank;
   at least one channel having an inlet connected to the outlet of the storage tank and an outlet toward the bottom end of the at least one subsoil tiller blade for depositing the nutrients at a depth of between 20 cm and 50 cm below the surface of the topsoil later and into the subsoil layer.

2. The apparatus of claim 1, comprising two or more subsoil tiller blades.

3. The apparatus of claim 1, wherein the conveyor is one of an auger, a belt, a pneumatic system, a pump and a dispenser.

4. The apparatus of claim 1, wherein the storage tank is a hopper and the nutrients are in the form of pellets.

5. An apparatus for use in enhancing the soil structure of land having a topsoil layer and a subsoil layer, the apparatus comprising:
   a support frame;
   two or more subsoil tiller blades mounted below the support frame, each subsoil tiller blade having a tilling surface that loosens the subsoil when driven through the land, and a bottom end, the at least one tilling surface being spaced from the support frame a distance that causes the tilling surface to extend to a depth of between 20 cm and 50 cm below a top surface of the topsoil layer and into the subsoil layer;
   a storage tank having a conveyor for conveying nutrients into an outlet of the storage tank;
   two or more channels, each channel mounted to a separate one of the two or more subsoil tiller blades, each channel having an inlet connected to the outlet of the storage tank and an outlet toward the bottom end of the at least one subsoil tiller blade for depositing the nutrients at a depth of between 20 cm and 50 cm below the top surface of the topsoil later and into the subsoil layer, and wherein the outlet of at least one channel is at a different depth than the outlet of one or more other channels.

* * * * *